(12) United States Patent
Notargiacomo et al.

(10) Patent No.: US 11,722,184 B2
(45) Date of Patent: Aug. 8, 2023

(54) DISTRIBUTED ANTENNA SYSTEM FOR MASSIVE MIMO APPLICATIONS

(71) Applicant: TEKO TELECOM S.R.L., Castel San Pietro Terme (IT)

(72) Inventors: Massimo Notargiacomo, Castel San Pietro Terme (IT); Lorenzo Minghini, Castel San Pietro Terme (IT)

(73) Assignee: Teko Telecom S.r.l., Castel San Peitro Terme (IT)

( * ) Notice: Subject to any disclaimer, the term of this patent is extended or adjusted under 35 U.S.C. 154(b) by 706 days.

(21) Appl. No.: 16/479,791

(22) PCT Filed: Jan. 19, 2018

(86) PCT No.: PCT/IB2018/050334
§ 371 (c)(1),
(2) Date: Jul. 22, 2019

(87) PCT Pub. No.: WO2018/134773
PCT Pub. Date: Jul. 26, 2018

(65) Prior Publication Data
US 2021/0336657 A1 Oct. 28, 2021

(30) Foreign Application Priority Data
Jan. 20, 2017 (IT) .................. 102017000006173

(51) Int. Cl.
*H04B 7/0413* (2017.01)
*H04B 7/022* (2017.01)

(52) U.S. Cl.
CPC ........... *H04B 7/0413* (2013.01); *H04B 7/022* (2013.01)

(58) Field of Classification Search
CPC .................. H04B 7/0413; H04B 7/022
(Continued)

(56) References Cited

U.S. PATENT DOCUMENTS

2004/0209590 A1* 10/2004 Forrester .................. H04B 1/48
455/324
2005/0157982 A1* 7/2005 Shishido .............. G02B 6/3845
385/37

(Continued)

FOREIGN PATENT DOCUMENTS

| CN | 203387690 | * | 1/2014 | ............ H04W 88/10 |
| EP | 3270528 A1 | * | 1/2018 | ............... G02B 6/42 |
| WO | 2013/009283 A1 | | 1/2013 | |

*Primary Examiner* — Ted M Wang
(74) *Attorney, Agent, or Firm* — David B. Tingey; Bryant J. Keller; Kirton McConkie (57) ABSTRACT

The distributed Antenna System for massive MIMO applications, comprises: a plurality of Point of Interface modules connectable to a Baseband Unit and configured for converting a digital data flow coming from the Baseband Unit to RF signals and/or for converting incoming RF signals to a digital data flow to be sent to the Baseband Unit; a plurality of optical modules operatively connected to the plurality of Point of Interface modules and configured for performing an electro-optical conversion of the RF signals; a plurality of Remote Units operatively connected to the optical modules and to a plurality of antennas; in which the optical modules comprises a plurality of uplink paths separated from each other and provided with respective uplink outputs.

16 Claims, 6 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2008/0056725 A1* | 3/2008 | Hettstedt | H04B 10/296 398/147 |
| 2008/0145061 A1* | 6/2008 | Lee | H04B 10/25758 398/139 |
| 2013/0177317 A1* | 7/2013 | Rospsha | H04B 10/25754 398/115 |
| 2013/0236180 A1 | 9/2013 | Kim | |
| 2014/0126914 A1* | 5/2014 | Berlin | H04B 10/25753 398/116 |
| 2015/0303998 A1 | 10/2015 | Stapleton | |
| 2015/0365934 A1* | 12/2015 | Liu | H04L 5/0039 370/329 |
| 2017/0012681 A1* | 1/2017 | Buliga | H04L 27/04 |

* cited by examiner

DISTRIBUTED ANTENNA SYSTEM FOR MASSIVE MIMO APPLICATIONS

TECHNICAL FIELD

The present invention relates to a Distributed Antenna System for massive MIMO applications.

BACKGROUND ART

With reference to DAS (Distributed Antenna System) networks in highly-demanding massive MIMO (Multiple-Input Multiple-Output) applications, as foreseen by the LTE (Long Term Evolution) standard, it is known the need to connect independently several downlink and uplink paths to a BBU (Baseband Unit).

Particularly, on the downlink path, the signal flows from the BBU to the antennas passing through the DAS system and the different MIMO paths should be kept separated so to maintain their mutual correlation (or decorrelation) properties.

The same behavior should apply to all uplink paths, thus all the links between the antennas and the BBU must be kept respectively independent.

When several MIMO paths are involved, with more uplink paths than downlink and with multiple Remote Units served by the same sector, there is the need to envisage a smart solution that scales with the high number of devices and antennas, thus to limit the DAS footprint and the uplink noise.

Furthermore, the co-existence of multiple bands, multiple operators, and multiple technologies in the same MIMO DAS system adds more complexity and this could result in a rise of footprint and cost.

The presence of several and independent uplink paths opens the way to the implementation of new positioning algorithms, beamforming and many other LTE Advanced features.

Eventually, the additional deployment of a relay network can boost the system precision and outlines the development of DAS advanced architectures and features for accurate positioning.

Moreover, extra independent MIMO paths significantly boost and strengthen the overall system performance.

Figure 1:
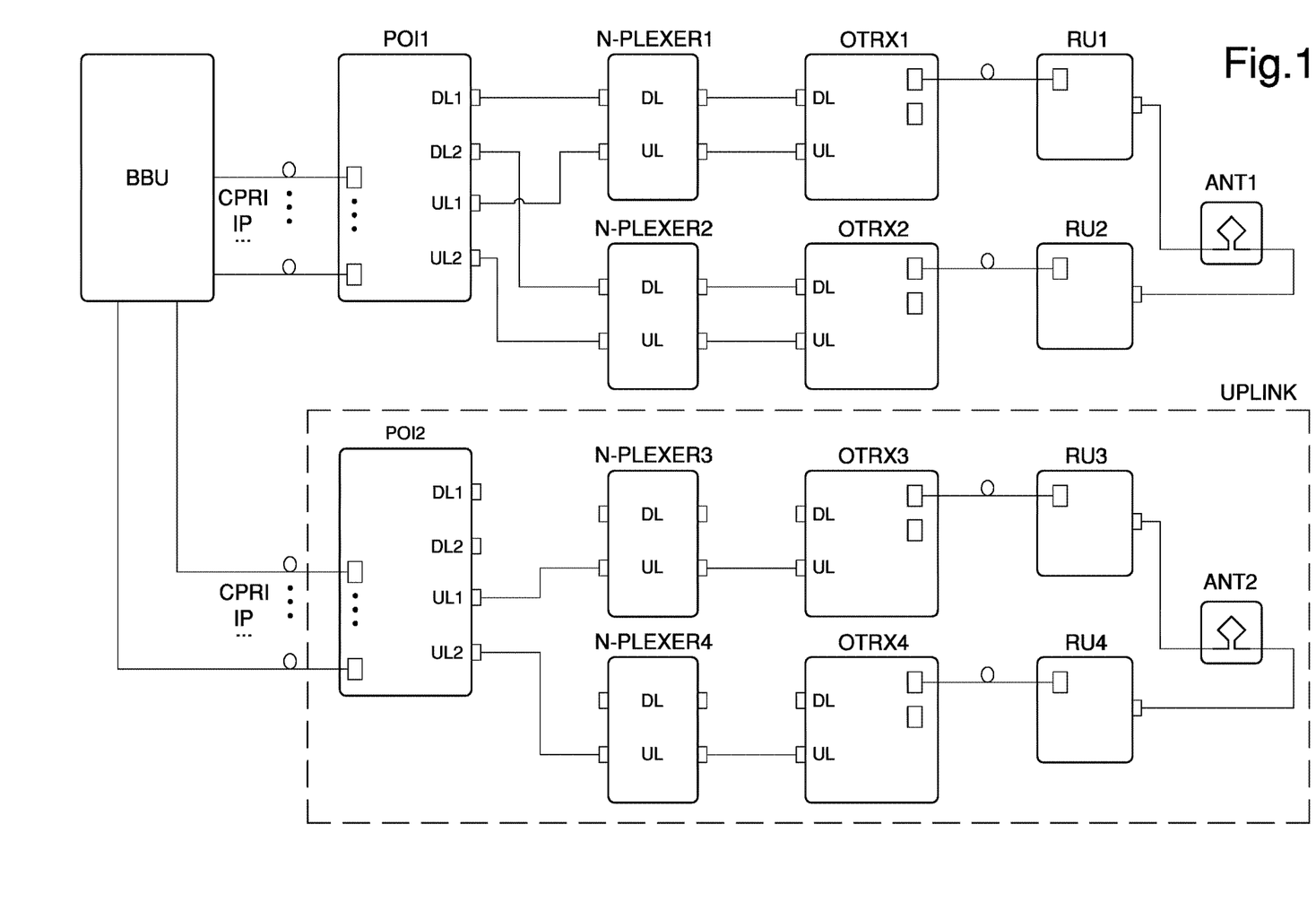
FIG. 1 shows a typical DAS MIMO 2×4 design.

A typical known application is a MIMO 2×4 scenario, shown as an example in FIG. 1, wherein two independent paths for the downlink and four for the uplink are used.

In this setup, the downlink signal is transmitted from the BBU to a first Point of Interface POI1, which converts the incoming digital data flow to an RF signal. Particularly, usually a plurality of POIs is used, each for a specific frequency band.

For each downlink path, independently for the first and second downlink ports DL1 and DL2 of the POI1, the RF signal is sent to the combining network, schematized with n-plexer modules N-PLEXER1 and N-PLEXER2, where different operators and bands are gathered into a unique information flow before reaching the downlink connectors of first and second optical modules OTRX1 and OTRX2.

The OTRX1 and OTRX2 (of the OTRX 1:2 type) perform the E/O conversion and convey the signal towards the first cross-polarized antenna ANT1 passing through the first and second Remote Units RU1 and RU2.

The uplinks signals run through the same path towards the BBU.

The two additional uplink paths needed to realize the MIMO 2×4 system are obtained inserting a second cross-polarized antenna ANT2 (though any kind of antenna diversity technique can be used) and doubling the whole system components described above by using: a second Point of Interface POI2, a third and fourth n-plexer3 and n-plexer4, a third and fourth optical modules OTRX3 and OTRX4 and a third and fourth Remote Units RU3 and RU4.

These known solutions, however, have some drawbacks.

Particularly, by doubling (or generally multiplying) the whole system components in order to obtain higher order MIMO systems (e.g., MIMO 4×8 and so on), the system footprint and cost rapidly rise.

DISCLOSURE OF THE INVENTION

The main aim of the present invention is to provide a Distributed Antenna System for massive MIMO applications with a brand-new architecture, that increments the number of independent uplink paths while optimizing space occupation, complexity and cost.

Another object of the present invention is to provide a Distributed Antenna System for massive MIMO applications that enhances the uplink system sensitivity by limiting the NF (Noise Figure) increase due to the use of multiple Remote Units serving the same sector or MIMO path.

Another object of the present invention is to provide a Distributed Antenna System for massive MIMO applications that allows for more precise and accurate positioning techniques thanks to the higher number of independent uplink paths.

BRIEF DESCRIPTION OF THE DRAWINGS

Other characteristics and advantages of the present invention will become better evident from the description of a preferred, but not exclusive, embodiment of a Distributed Antenna System for massive MIMO applications, illustrated by way of an indicative but non-limiting example in the accompanying Figures, in which.

EMBODIMENTS OF THE INVENTION

This invention is related to DAS designs where several downlink and uplink paths need to be connected independently to the BBU for highly-demanding massive MIMO applications as foreseen by the LTE standard.

It is pointed out that the DAS system according to the invention could be connected to a conventional BBU, to a BBU pool, for example of the type of a software-implemented BBU pool.

Particularly, the proposed invention is a brand-new architecture that increments the number of independent uplink paths while optimizing space occupation, complexity and cost.

Generally, the Distributed Antenna System architecture according to the invention comprises:
- a plurality of Point of Interface modules connectable to a Baseband Unit and configured for converting a digital data flow coming from said Baseband Unit to RF signals and/or for converting incoming RF signals to a digital data flow to be sent to said Baseband Unit;
- a plurality of optical modules operatively connected to said plurality of Point of Interface modules and configured for performing an electro-optical conversion of the RF signals;
- a plurality of Remote Units operatively connected to said optical modules and to a plurality of antennas.

Preferably, the Distributed Antenna System architecture according to the invention comprises also a plurality of n-plexer modules between the optical modules and the Point of Interface modules, where different operators and bands are gathered into a unique information flow.

Figure 2:
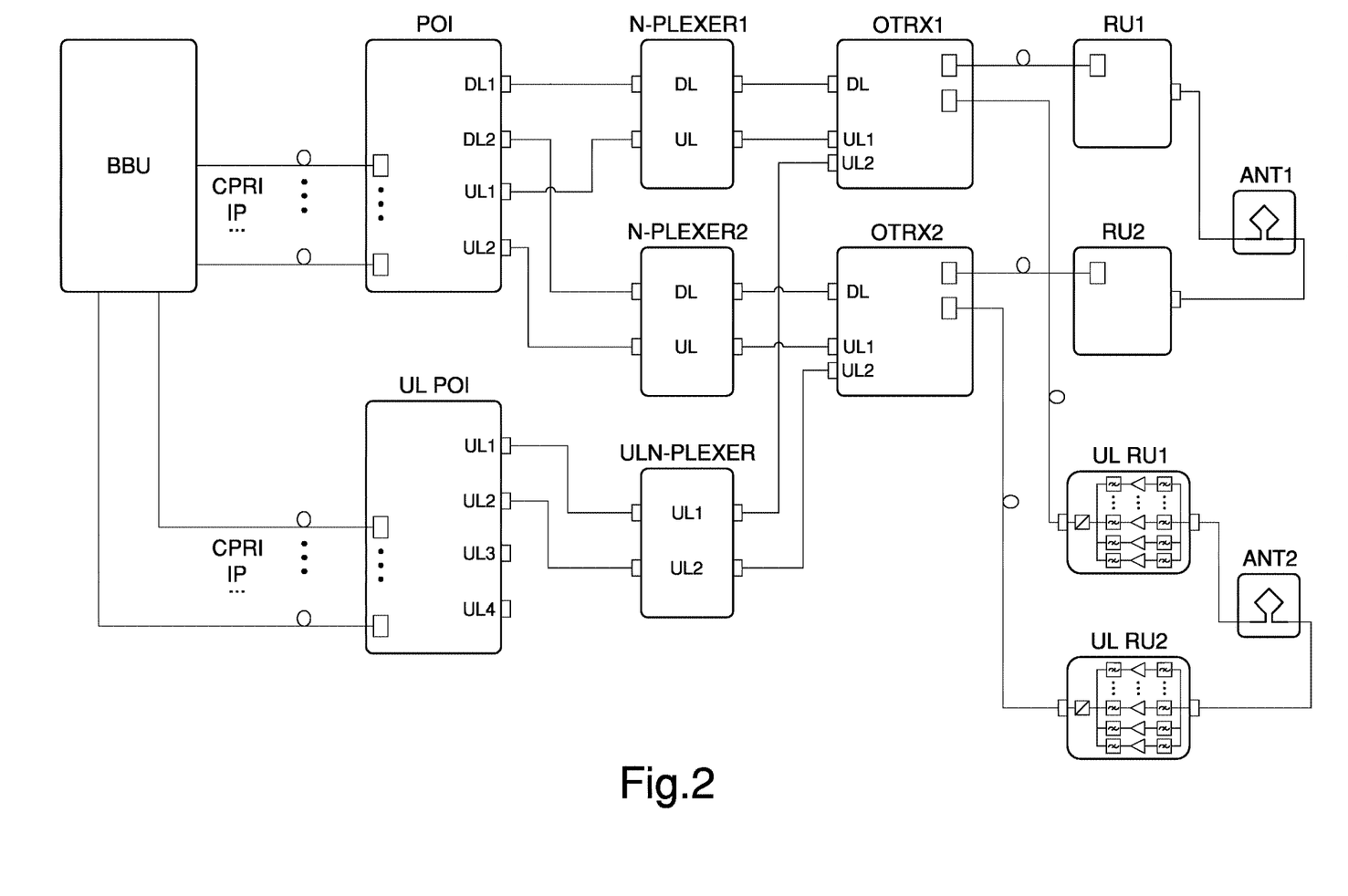
FIG. 2 shows a first possible embodiment of the Distributed Antenna System according to the invention, assuming a MIMO 2×4 scenario.

The design of the overall system implementation according to a first possible embodiment is depicted in FIG. 2 and it is described below.

Particularly, FIG. 2 shows the Distributed Antenna System architecture according to the invention, assuming a MIMO 2×4 scenario.

In this case, the DAS system comprises a first Point of Interface module POI1, of the conventional type, connected to a BBU and to a first n-plexer module N-PLEXER1 and a second n-plexer module N-PLEXER2, both of the known type. It is pointed out that a plurality of POIs could be used, each for a specific frequency band.

Particularly, each of the POI blocks showed in the Figures can correspond to a plurality POIs related to a specific frequency band. Anyway, the use of a single POI configured for operating in different frequency bands is not excluded.

Particularly, the first downlink port DL1 and the first uplink port UL1 of the POI1 are connected respectively to the downlink port and to the uplink port of the first n-plexer module N_PLEXER1.

Similarly, the second downlink port DL2 and the second uplink port UL2 of the POI1 are connected respectively to the downlink port and to the uplink port of the second n-plexer module N_PLEXER2.

Furthermore, the DAS system comprises a first Remote Unit RU1 and a second Remote Unit RU2, both of the known type, connected to a first antenna ANT1, preferably of the cross-polarized type.

Advantageously, the DAS system according to the invention comprises four newly conceived components, showed in FIGS. 3, 4, 5 and 6 and described below.

The DAS system comprises at least an uplink Remote Unit operatively connected to a respective optical module and configured for filtering and performing an electro-optical conversion of uplink RF signals.

Particularly, with reference to the embodiment of FIG. 2, the DAS system comprises a first uplink Remote Unit ULRU1 and a second uplink Remote Unit ULRU2 connected to a second antenna ANT2.

Figure 3:
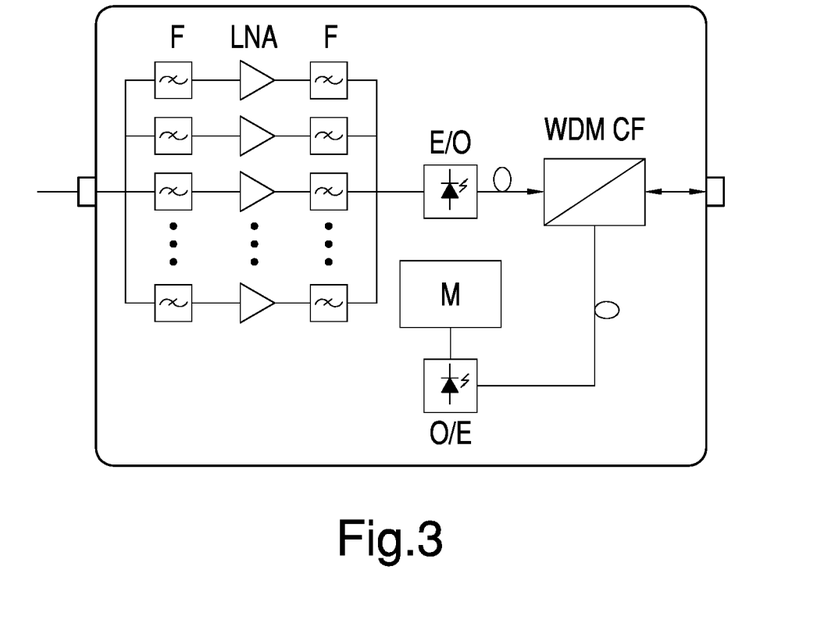
FIG. 3 shows a detail of an uplink Remote Unit of the Distributed Antenna System according to the invention.

A detail of the uplink remote units ULRU1 and ULRU2 is showed in FIG. 3.

Each uplink Remote Unit ULRU1, ULRU2 comprises a plurality of band-pass filters F related to respective frequency bands.

Furthermore, each uplink Remote Unit ULRU1 and ULRU2 comprises a plurality of Low Noise Amplifier LNA operatively connected to the band-pass filters F.

Furthermore, each uplink Remote Unit ULRU1 and ULRU2 comprises an electro-optical converter E/O operatively connected to the plurality of band-pass filter F and an optical coupler WDM CP operatively connected to the electro optical converter E/O.

Therefore, each of the uplink Remote Units ULRU1 and ULRU2 is composed by a certain number of band-pass filters F with a dedicated LNA (depending on the number of served bands).

All the signals coming from the band-pass filters F are merged into one single stream used to drive the electro-optical converter E/O.

Preferably, the optical coupler WDM CP is of the type of a WDM coupler and divides the uplink path from the system management signals flowing through the fiber optic cable.

Usefully, each Uplink Remote Unit ULRU1 and ULRU2 comprises an optical-electro converter O/E connected to the WDM coupler WDM CP and suitable for converting the optical signal coming from the WDM coupler into an electric signal to be sent to a system management modem M. The modem M is used for sending or receiving system management data to or from a remote management unit.

Advantageously, the DAS system according to the invention comprises an optical module provided with single downlink path splitted in multiple outputs and with a plurality of uplink paths separated from each other and provided with respective uplink outputs.

Particularly, with reference to the embodiment of FIG. 2, the DAS system comprises a first optical module OTRX1 and a second optical module OTRX2.

Each optical module OTRX1 and OTRX2 is provided with a single downlink path splitted in two outputs and comprises a first uplink path and a second uplink path separated from each other and provided with respective uplink outputs $UL_{RF}1$, $UL_{RF}2$.

Figure 4:
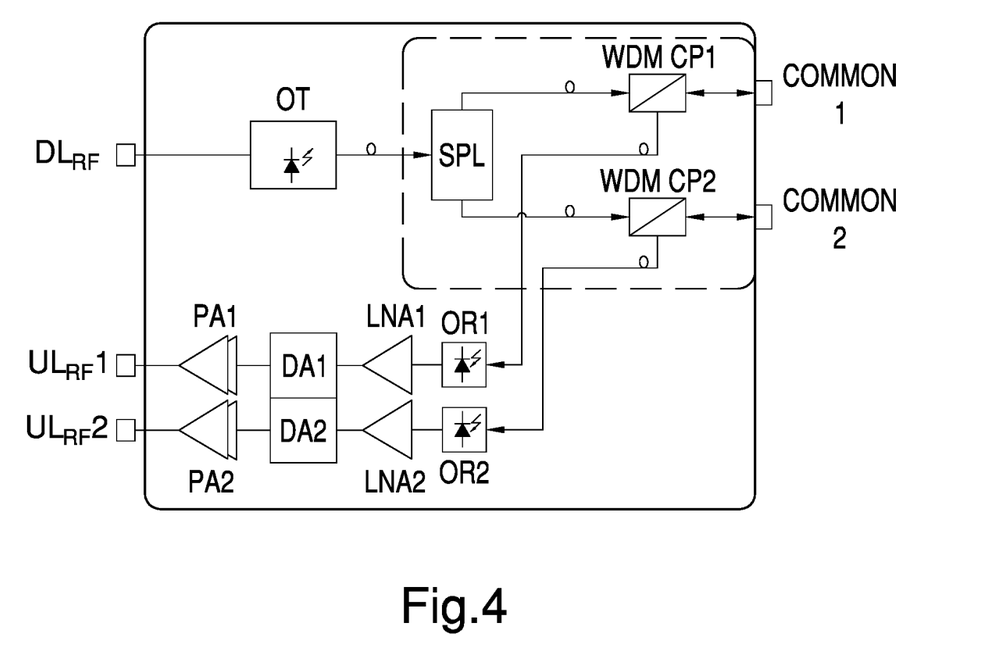
FIG. 4 shows a detail of a master unit optical module of the Distributed Antenna System according to the invention.

A detail of the optical modules OTRX1 and OTRX2 is showed in FIG. 4.

Particularly, the downlink path of each optical module OTRX1 and OTRX2 comprises:
- an optical transmitter OT (particularly an electro-optical converter);
- an optical splitter SPL operatively connected to said optical transmitter OT;
- a first optical coupler WDM CP1 and second optical coupler WDM CP2 operatively connected to said optical splitter SPL.

Furthermore, the first uplink path of each optical module OTRX1 and OTRX2 comprises:
- a first optical coupler WDM CP1;
- a first optical receiver OR1 (particularly an optical-electrical converter) operatively connected to the first optical coupler WDM CP1 and operatively associated to the first uplink output $UL_{RF}1$.

Furthermore, the first uplink path comprises:
- a first low noise amplifier LNA1 operatively connected to the first optical receiver OR1;
- a first digital attenuator DA1 operatively connected to the first amplifier LNA1;
- a first power amplifier PA1 operatively connected to the first digital attenuator DA1.

Similarly, the second uplink path of each optical module OTRX1 and OTRX2 comprises:
- a second optical coupler WDM CP2;

a second optical receiver OR2 (particularly an optical-electrical converter) operatively connected to the second optical coupler WDM CP2 and operatively associated to the second uplink output $UL_{RF}2$.

Furthermore, the second uplink path comprises:

a second low noise amplifier LNA2 operatively connected to the second optical receiver OR2;

a second digital attenuator DA2 operatively connected to the second amplifier LNA2;

a second power amplifier PA2 operatively connected to the second digital attenuator DA2.

Therefore, each Master Unit optical module OTRX1 and OTRX2 is equipped with one optical transmitter OT split by two and two independent optical receivers OR1 and OR2.

The Optical module according to the present invention differs from the one of the prior solution because of the absence on the uplink path of an internal RF combiner after the O/E conversion.

In such a way, the optical module according to the present invention comprises two separated uplink paths.

As showed in FIG. 2, the first ports COMMON1 of the two optical modules OTRX1 and OTRX2 are connected, respectively, to the first Remote Unit RU1 and to the second Remote Unit RU2.

The second ports COMMON2 of the two optical modules OTRX1 and OTRX2 are connected, respectively, to the first uplink Remote Unit ULRU1 and to the second uplink Remote Unit ULRU2.

Advantageously, the DAS system according to the invention comprises at least an uplink n-plexer module configured for filtering only the uplink signal and for demultiplexing said uplink signal into different uplink bands (served by the DAS system).

Particularly, with reference to the embodiment of FIG. 2, the DAS system comprises an uplink n-plexer module, showed in FIG. 2 as UL n-plexer, connected to the second uplink outputs $UL_{RF}2$ of each optical module OTRX1 and OTRX2.

The first uplink outputs $UL_{RF}1$ of each optical module OTRX1 and OTRX2 are connected, respectively, to the uplink ports of the n-plexer modules N-PLEXER1 and N-PLEXER2.

Figure 5:
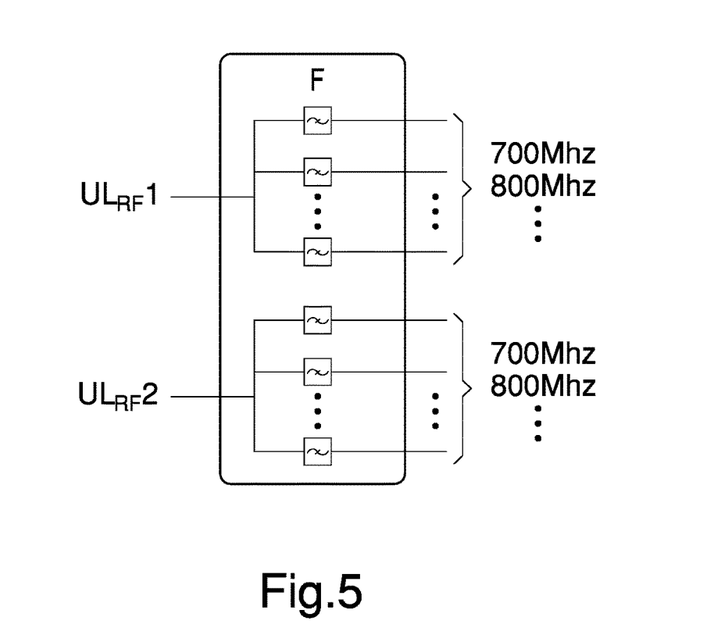
FIG. 5 shows a detail of an uplink n-plexer of the Distributed Antenna System according to the invention.

A detail of the UL N-PLEXER is showed in FIG. 5.

Particularly, the UL n-plexer comprises a plurality of filters F connected to respective uplink inputs $UL_{RF}1$ and $UL_{RF}2$.

Advantageously, the DAS system according to the invention comprises at least an uplink Point of Interface provided with a plurality of RF uplink input and configured for collecting all the independent uplink RF signals at its input and forward them, after an A/D conversion, to a BBU with a specific communication protocol (e.g., CPRI, IP, etc.) and physical interface (SFP, RJ45, etc.).

With reference to the embodiment of FIG. 2, the DAS system comprises an uplink Point of Interface UL POI connected to a BBU and provided with four uplink ports UL1, UL2, UL3, UL4.

The first and second uplink ports are connected to respective uplink outputs $UL_{RF}1$ and $UL_{RF}2$ of the UL n-plexer.

A different number of uplink ports is not excluded.

Figure 6:
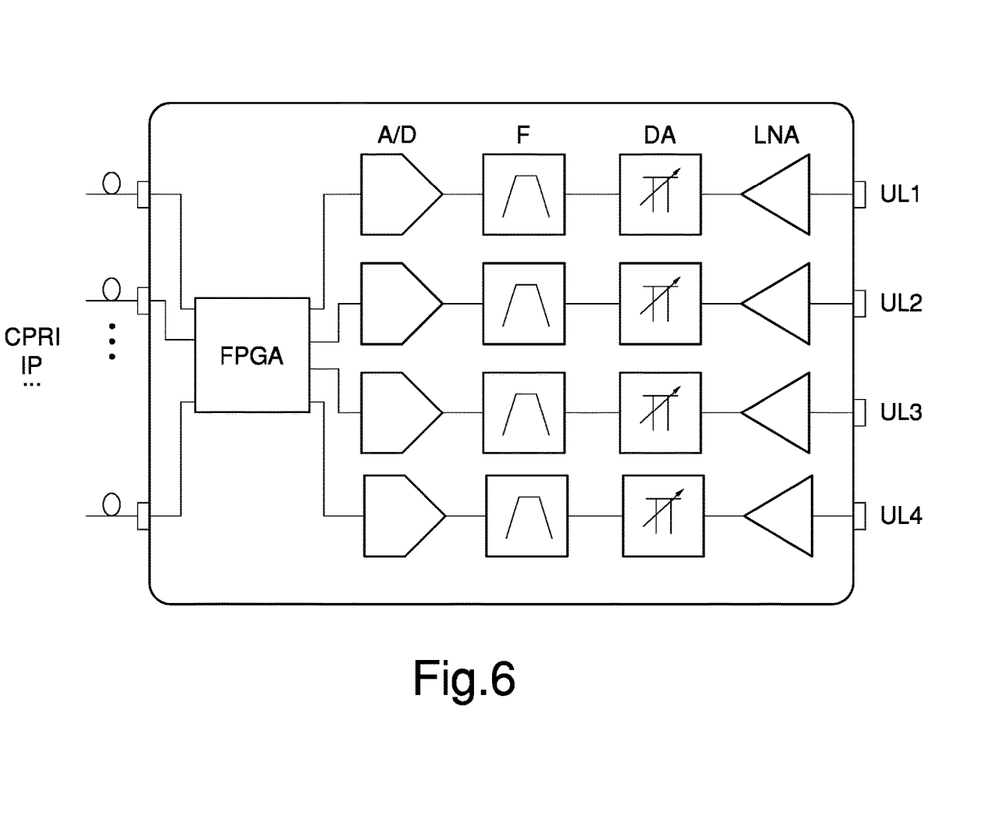
FIG. 6 shows a detail of an uplink Point of Interface of the Distributed Antenna System according to the invention.

A detail of the uplink Point of Interface UL POI is showed in FIG. 6. Particularly, the UL POI comprises a plurality of low noise amplifier LNA, a plurality of digital attenuator DA connected to the low noise amplifiers LNA, a plurality of filters F connected to the digital attenuators DA, and a plurality of analogic to digital converters A/D connected to the filters F.

Furthermore, the UL POI comprises a field-programmable circuit, of the type of a FPGA (Field-Programmable Gate Array), operatively connected to the plurality of analogic to digital converters A/D and configured for forwarding the received digital signals to the BBU with a specific communication protocol.

The functioning of the DAS system according to the invention and assuming a MIMO 2×4 scenario as showed in FIG. 2 is disclosed here below.

The downlink signal is transmitted digitally (for example, by means of a CPRI protocol, an IP protocol or other protocols) from a BBU to the POI.

Here, the signal is converted from digital to RF and, assuming a MIMO 2×4 scenario, it is forwarded to the first downlink output port DL1 and to the second downlink output port DL2 of the POI.

For each downlink path (i.e., independently for POI DL1 and DL2 ports), the downlink RF signal is combined together with other operators' carriers or other frequency bands, respectively by means of the first n-plexer N-PLEXER1 and second n-plexer N-PLEXER2.

Then the downlink RF signal is transmitted to the first Remote Unit RU1 and to the second Remote Unit RU2 through the first Optical module OTRX1 and the second Optical module OTRX2, and then to the first antenna ANT1.

In particular, each Optical module OTRX1 and OTRX2 does the electro-optical conversion by means of the electro-optical converter E/O and forwards the optical signal respectively to the first and second units RU1 and RU2 via fiber optic connected to its first output port COMMON1 and second output port COMMON2, as depicted in FIG. 4.

The two uplink paths of the signal coming from the first antenna ANT1 are equivalent, therefore they enter their own Remote Units RU1 and RU2; then the Common1 port of their respective Optical modules OTRX1 and OTRX2, after the optical to RF conversion, they are sent towards the POI and then digitally to the BBU.

In order to realize a 2×4 MIMO system, the uplink must carry four independent information streams.

To this purpose, two additional uplink paths are obtained adding to the DAS system a second cross-polarized antenna ANT2 (in general, any kind of antenna diversity technique can be used).

The uplink RF signal coming from each port of the dedicated MIMO antenna ANT2 is sent to a respective uplink Remote Unit UL RU1 and UL RU2, where each band is independently filtered and amplified.

Then all bands are combined again together into a single fiber optic cable and are sent to the second optical port COMMON2 of the first Optical module OTRX1 and of the second Optical module OTRX2.

Usefully, multiple uplink Remote Units can be inserted in the same box, thus reducing the final system footprint.

The newly-designed Optical module has two independent uplink paths, thus the RF signal at ports $UL_{RF}1$ and $UL_{RF}2$ is not a combination of the received signals on COMMON1 and COMMON2 as it was in the known solutions.

The uplink signals coming from the $UL_{RF}2$ ports of each of the Optical modules OTRX1 and OTRX2 are then band-filtered by the UL N-PLEXER and conveyed towards their own 4-port uplink POI (depending on their carrier frequency).

In the UL POI module, the RF signals are A/D converted and forwarded to the BBU, always maintaining independency.

Advantageously, in the MIMO 2×4 design according to the invention it is necessary to add only two uplink paths with respect to the known solutions, hence two ports of the 4-port UL POI are free for future upgrades (e.g., to implement a MIMO 4×8 system).

Furthermore, this design allows to limit the NF (Noise Figure) increase due to the use of several Remote Units for the same sector.

In fact, when combining signals from NRU Remote Units, the NF increases according to following formula, where NFRU is the noise figure of a single Remote Unit.

$$NFDAS=NFRU+10\log 10\, NRU$$

This is because each RU adds its own noise when combining signals together. Keeping the UL signals separated until the BBU, avoid the noise power to rise and allows to exploit diversity techniques at the BBU side thus optimizing the sensitivity of the system.

Moreover, positioning algorithms based on different principles (TDOA, received power, etc.) can be used to localize and track the UE (User Equipment) camping inside a specific cell.

In fact, as far as one knows the antennas and RUs location, it is possible to interpolate the measured signals and determine the mobile position with higher precision due to the fact that each remote unit is linked to individual receiver at BBU side.

It is important to note that the design is not limited to the use of an OTRX 1:2 (one optical transmitter split by two and two independent optical receivers) or a 4-Uplink port POI.

In the case of the optical module, multiple optical ports can be used to forward the downlink data to the Remote Units and to independently receive the uplink signal.

Moreover, it is possible to use a stand-alone equipment with a bank of independent optical receivers (ORXs) for the uplink while using in parallel an OTRX 1:n.

The DAS system according to the invention is highly scalable, in fact the implementation of a MIMO 4×8 system is a straightforward upgrade of the first embodiment disclosed above.

Figure 7:
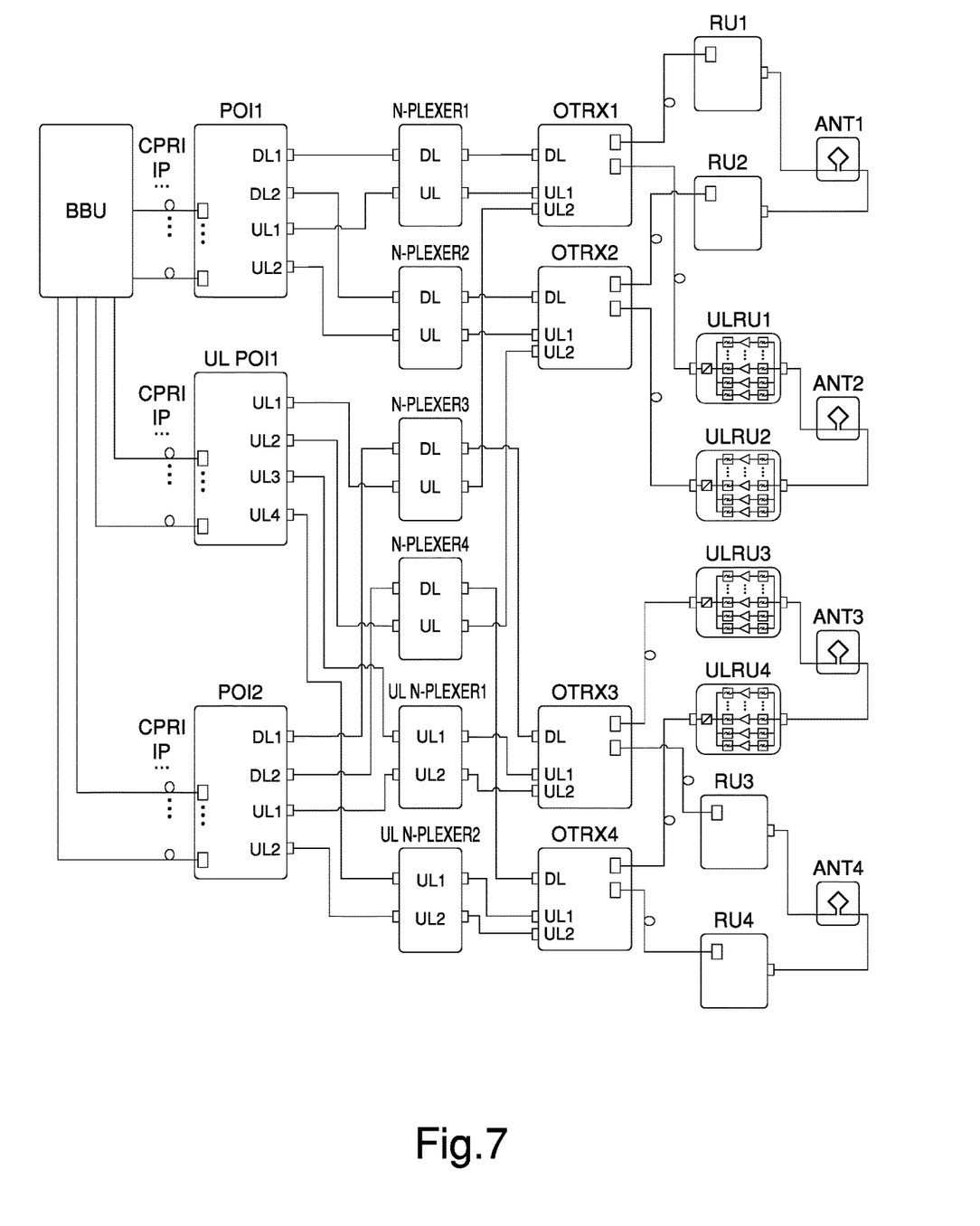
FIG. 7 shows a second possible embodiment of the Distributed Antenna System according to the invention, assuming a MIMO 4×8 scenario.

A second possible embodiment of the DAS system according to the invention, related to a MIMO 4×8 scenario, is showed in FIG. 7.

Particularly, if compared to the MIMO 2×4 solution, the MIMO 4×8 DAS solution comprises an additional POI (POI2), two additional n-plexer modules (N-PLEXER3, N-PLEXER4), an additional uplink n-plexer module (UL N-PLEXER2), two additional optical modules (OTRX3, OTRX4), two additional Remote Units (RU3, RU4), and two additional uplink Remote Units (ULRU3, ULRU4.

Iterating this reasoning, it is possible to extend MIMO capabilities as needed with a remarkable save in the DAS equipment with respect to the known solutions.

Figure 8:
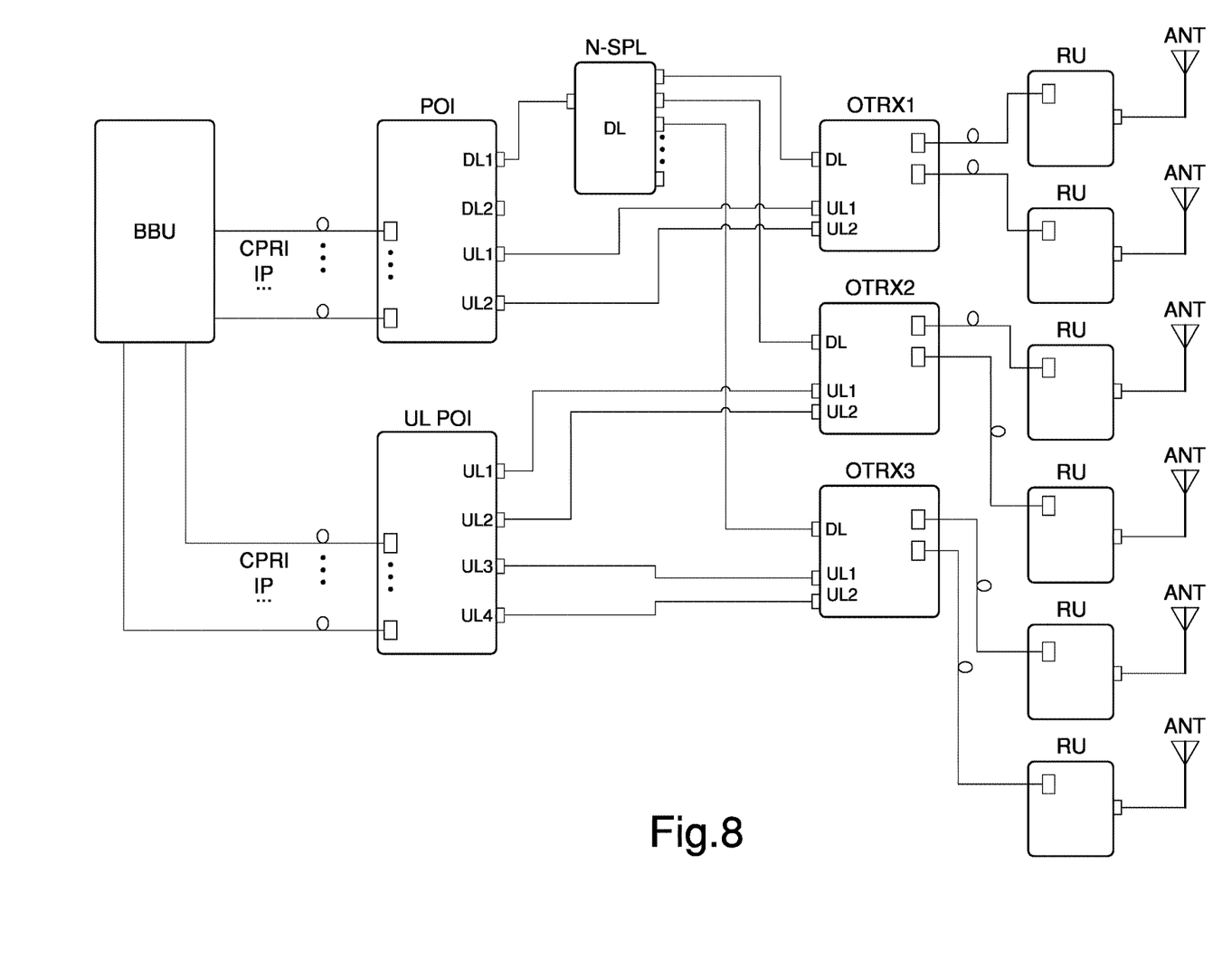
FIG. 8 shows a third possible embodiment of the Distributed Antenna System according to the invention, with single sector DAS fed by multiple Remote Units.

Another possible embodiment that extremely takes advantage of the proposed invention is the one drawn in FIG. 8.

In this setup, the BBU serves an environment with multiple antennas ANT and Remote Units RU belonging to a single sector.

The n-plexer has been omitted from the figure for sake of clarity, but it is important to remark that the number of bands is not a limiting factor in this approach (multiband is completely supported).

On the downlink path, the signal coming from the BBU is split across the different OTRXs and RUs, thus all the antennas will serve the same sector. For example, this approach can be used in urban canyons, long streets or tunnels.

On the uplink path, thanks to the OTRX with the separate uplink paths and to the UL POI, it is possible to bring a set of independent uplink signals (as many as the RUs number) to the BBU.

According to this solution, it is possible to process all this information in order to mitigate the interference (e.g., thanks to Interference Rejection Compensation techniques), for accurate positioning, receiver diversity techniques, beamforming, etc.

An example of application is an emergency call, where the mobile needs to be localized in the environment. Usually, the precision is limited by the cell size, but the proposed solution can exploit the independent UL signals to locate the mobile inside the cell.

These techniques may exploit the received signal power on each path (knowing the antennas position), the signals TDOA, or even a combination of them.

Moreover, the system NF in the UL benefits from this implementation, because all paths are kept separated and the signal is recombined only at the BBU, where diversity algorithms avoid the NF to increase.

Finally, nothing forbids to replace the classical DL/UL RUs with the Uplink-only RUs (e.g., if DL coverage is already sufficient), in this way we limit the cost while enabling all the above-mentioned features.

In practice it has been observed that the described invention achieves the intended purposes.

Particularly, the proposed invention has several advantages with respect to the prior solution, in fact we can highlight the following key features:

it enables Distributed Antenna Systems to implement massive MIMO with more UL paths than DL in a straightforward design;

enhance the UL system sensitivity by limiting the NF increase due to the use of multiple RUs serving the same sector or MIMO path;

more precise and accurate positioning techniques can be easily exploited thanks to the higher number of independent uplink paths;

reduction of footprint;

reduction of cost.

Therefore, the implementation of MIMO systems with more UL paths than DL and with multiple RUs served by the same sector requires less components, leading to a significant reduction of footprint and cost of the DAS system.

Expanding the number of independent UL paths while adding no significant complexity to the system defines a clear path to the implementation of modern LTE Advanced techniques, such as beamforming, carrier aggregation, cooperative MIMO, etc.

The significant reduction on the number of required components, gets higher as the number of antennas rise, so it is easy to comprehend that the proposed invention has a crucial role in deploying future technologies demanding massive MIMO implementations. Moreover, the number of FO cables needed to connect the BBU to the DAS system is always less than or equal if compared to the previous solution. This aspect could play a crucial role in those scenarios where restrictions on the number of FO cables exist (e.g., cable renting).

The sensitivity of the system can be enhanced by the adoption of the conceived invention when more than one RU is used for the same sector. In fact, the NF is limited keeping the UL signals separated until the BBU thus avoiding the noise power to rise. Therefore, diversity techniques can be exploited at the BBU side thus optimizing the uplink system sensitivity.

Furthermore, the conceived design permits to exploit positioning-related features inside a specific cell using a minimum number of components. In fact, as far as one knows the antennas and RUs location, it is possible to interpolate the measured signals and determine the mobile position with higher precision due to the fact that each remote unit is linked to individual receiver at BBU side. The setup flexibility and ease of integration in currently deployed DAS platforms, enables the use of new features and technologies without replacing the existing infrastructure. A wide range of real-world scenarios can benefit from this solution, improving QoS (Quality of Service), capacity, and coverage while offering advanced positioning capabilities.

The benefits of the proposed solution can be exploited by multiple operators in multiple technologies and in multiple bands for both SISO and MIMO designs, thanks to the state-of-the-art and compact design of the Distributed Antenna System.

The invention claimed is:

1. A distributed antenna system for massive MIMO applications, comprising:
    a plurality of point of interface modules connectable to a baseband unit and configured for at least one of converting a digital data flow coming from said baseband unit to RF signals and for converting incoming RF signals to a digital data flow to be sent to said baseband unit;
    a plurality of optical modules operatively connected to said plurality of point of interface modules and configured for performing an electro-optical conversion of the RF signals; and
    a plurality of remote units operatively connected to said optical modules and to a plurality of antennas;
    wherein at least one of said optical modules comprises a plurality of uplink paths separated from each other and provided with respective uplink outputs,
    wherein said optical module comprises a single downlink path split into multiple outputs, and
    wherein said downlink path comprises:
        at least an optical transmitter;
        at least an optical splitter operatively connected to said optical transmitter; and
        a plurality of optical couplers operatively connected to said optical splitter.

2. The distributed antenna system according to claim 1, wherein said plurality of remote units comprises at least an uplink remote unit operatively connected to a respective optical module and configured for filtering, amplifying, and performing an electro-optical conversion of uplink RF signals.

3. The distributed antenna system according to claim 2, wherein said uplink remote unit comprises a plurality of band-pass filters related to respective frequency bands.

4. The distributed antenna system according to claim 3, wherein said uplink remote unit comprises a plurality of low noise amplifiers operatively connected to said band-pass filters.

5. The distributed antenna system according to claim 3, wherein said uplink remote unit comprises at least an electro-optical converter operatively connected to said plurality of band-pass filters.

6. The distributed antenna system according to claim 5, wherein said uplink remote unit comprises at least an optical coupler operatively connected to said electro-optical converter.

7. The distributed antenna system according to claim 2, wherein each of said uplink paths comprises:
    at least an optical coupler; and
    at least an optical receiver operatively connected to said optical coupler and operatively associated to one of said uplink outputs, and
wherein each of said uplink paths comprises:
    at least an amplifier operatively connected to said optical receiver;
    at least a digital attenuator operatively connected to said amplifier; and
    at least a power amplifier operatively connected to said digital attenuator.

8. The distributed antenna system according to claim 1, wherein each of said uplink paths comprises:
    at least an optical coupler; and
    at least an optical receiver operatively connected to said optical coupler and operatively associated to one of said uplink outputs.

9. The distributed antenna system according to claim 8, wherein each of said uplink paths comprises:
    at least an amplifier operatively connected to said optical receiver;
    at least a digital attenuator operatively connected to said amplifier; and
    at least a power amplifier operatively connected to said digital attenuator.

10. The distributed antenna system according to claim 1, further comprising an uplink n-plexer module configured for filtering only an uplink signal and for demultiplexing said uplink signal into different uplink bands.

11. The distributed antenna system according to claim 1, wherein said plurality of point of interface modules comprises at least an uplink point of interface provided with a plurality of RF uplink input and configured for collecting each independent uplink RF signal at its input and to forward them, after an A/D conversion, to a BBU with a specific communication protocol and physical interface.

12. The distributed antenna system according to claim 11, wherein said uplink point of interface comprises a plurality of analogic to digital converters.

13. The distributed antenna system according to claim 12, wherein said uplink point of interface comprises at least a field-programmable circuit operatively connected to said plurality of analogic to digital converters and configured for forwarding received digital signals with a specific communication protocol.

14. An uplink remote unit for a distributed antenna system operatively connectable to a respective optical module and to at least an antenna, comprising an uplink RF connector and an uplink optical connector and that is configured for filtering and performing an electro-optical conversion exclusively of uplink RF signals,
    wherein said respective optical module comprises a single downlink path split into multiple outputs, and
    wherein said downlink path comprises:
        at least an optical transmitter;
        at least an optical splitter operatively connected to said optical transmitter; and
        a plurality of optical couplers operatively connected to said optical splitter.

15. An optical module for a distributed antenna system, comprising a single downlink path splitted in multiple outputs and a plurality of uplink paths separated from each other and provided with respective uplink outputs,
    wherein said downlink path comprises:
        at least an optical transmitter;
        at least an optical splitter operatively connected to said optical transmitter; and a plurality of optical couplers operatively connected to said optical splitter.

16. The optical module for the distributed antenna system of claim 15, wherein each of said uplink paths comprises:
- at least an optical coupler; and
- at least an optical receiver operatively connected to said optical coupler and operatively associated to one of said uplink outputs, and wherein each of said uplink paths comprises:
- at least an amplifier operatively connected to said optical receiver;
- at least a digital attenuator operatively connected to said amplifier; and
- at least a power amplifier operatively connected to said digital attenuator.

* * * * *